Sept. 6, 1960 G. ROSIER ET AL 2,951,995
CIRCUIT FOR CONTROLLING THE RESONANCE
FREQUENCY OF AN OSCILLATORY CIRCUIT
Filed Sept. 16, 1957

INVENTOR
GERARDUS ROSIER
MARIE MARCEL ANTOINE ARNOLD GHISLAIN VERSTRAELEN
BY
AGENT

United States Patent Office 2,951,995
Patented Sept. 6, 1960

2,951,995

CIRCUIT FOR CONTROLLING THE RESONANCE FREQUENCY OF AN OSCILLATORY CIRCUIT

Gerardus Rosier and Marie Marcel Antoine Arnold Ghislain Verstraelen, both of Hilversum, Netherlands, assignors to North American Philips Company, Inc., New York, N.Y., a corporation of Delaware Filed Sept. 16, 1957, Ser. No. 684,177

Claims priority, application Netherlands Oct. 2, 1956

5 Claims. (Cl. 332—16)

This invention relates to circuits for controlling the resonance frequency of an oscillatory circuit, for example for readjusting the frequency or modulating an oscillator by means of a detector circuit which is coupled to the circuit and which comprises the series combination of a capacitor and a rectifier controlled by a control value. In such circuits, use is made of the variable time during which the rectifier is conducting as a function of the control value in said series combination, so that the current flowing through the series combination, which is shifted in phase with respect to the voltage of the circuit, is varied by the control value and hence causes the resonance of the circuit to be detuned.

In most cases, a control voltage is included as a variable threshold voltage in series with the rectifier, but this has the disadvantage with respect to a control current to be supplied to the rectifier that the resultant detuning is greatly dependent upon the ratio between the voltage of the circuit and the control voltage, whilst in practice it is also very difficult to obtain a linear relationship between the detuning obtained and the control voltage. However, when use is made of a control current, a considerably higher control energy is required, unless the control source is connected to the rectifier via a choke coil which is active for the frequency of the circuit, but the choke coil with said capacitor then introduces unwanted additional resonance.

The invention is characterized in that the collector base path of a transistor is connected as a rectifier, whilst the control value is supplied to the emitter-base circuit. It underlies recognition of the fact that the collector-base circuit of the transistor operates, in co-action with the capacitor, as a detector for the voltage of the circuit and produces a corresponding voltage at the collector of the transistor, which voltage is active as a supply voltage for the transistor. The alternating current traversing said series-combination is, in this case, substantially proportional to the emitter-control current of the transistor, whilst only a small control energy is required.

In this connection, it is mentioned that circuits for detuning a circuit by means of a transistor are known per se, which transistor is not connected as a collector-base rectifier, but is normally connected as an amplifier and coupled to the circuit via a capacitor constituting an impedance, negligible, for example, for the frequency of the circuit. In this case, the circuit is detuned by the inner collector-base capacity or in general the inner collector base impedance of the transistor which is dependent upon the emitter current. However, the variation in capacity or impedance with the emitter current is far from being linear and also applies only for a much restricted region.

In order that the invention may be readily carried into effect, it will now be described more fully, by way of example, with reference to the accompanying drawing, in which.

Figure 1:
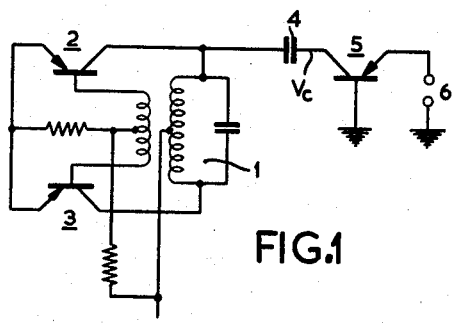
Fig. 1 shows one embodiment of the invention.

Referring now to Fig. 1, the oscillatory circuit to be detuned is indicated by 1. It may be included in a feedback circuit comprising transistors 2 and 3, so that undamped oscillations are maintained across the circuit 1. For controlling the resonance frequency of the circuit 1 and hence the frequency of the oscillations produced, said circuit has coupled to it a detector circuit comprising the series-combination of a capacitor 4 and the collector-base path of a transistor 5 which is active as a rectifier, the transistor being assumed to be of the p-n-p type. Said frequency is controlled by a control voltage supplied via terminals 6 to the emitter of transistor 5.

Figure 2:
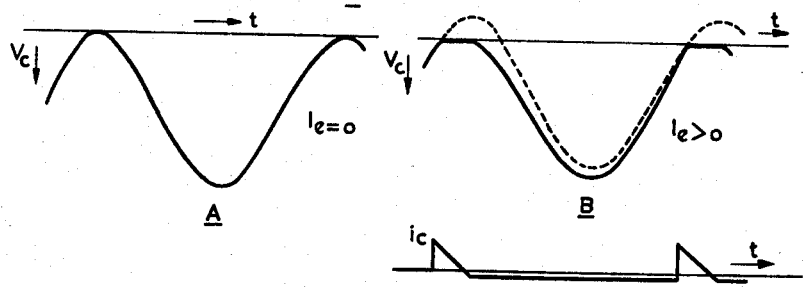
Fig. 2 shows voltage-time and current-time diagrams which serve to explain Fig. 1.

If the emitter current $I_e$ of transistor 5 is zero, it will show, due to collector-base rectification, a collector voltage $V_c$ as a function of the time $t$, as shown in Fig. 2A. This voltage has, on the average, a considerable negative value and may thus serve as the biassing potential required to operate transistor 5 as an amplifier. If, therefore, an emitter current $I_e$ is supplied to the terminals 6, this current reaches the collector of transistor 5 and charges the right-hand electrode of capacitor 4 in positive sense resulting in a voltage-time diagram as shown in Fig. 2B (curve shown in full line).

During the transient positive peaks of the collector voltage $V_c$ in Fig. 2B, a current $i_c$ flows due to collector-base rectification (Fig. 2C) and during the longer negative periods, there is a flow of current substantially equal to the control current $I_e$ which is supplied to the terminals 6. Since the collector has no direct-current connection with the other electrodes, the voltage $V_c$ adjusts itself in a manner such that the current $i_c$ does not contain a direct-current component. An alternating voltage is then set up across the capacitor 4, which voltage is obtained by integration of the current $i_c$ and is equal to the sinusoidal voltage across the circuit 1 (curve shown in dotted line in Fig. 2B) and the actually produced collector voltage $V_c$ (curve shown in full line in Fig. 2B). The fundamental wave of the alternating current $i_c$ produced is then found to be substantially proportional to the emitter control-current $I_e$, so that linear frequency modulation becomes possible through a wide range. The modulation energy required for this purpose is then extremely small.

Figures 3, 4:
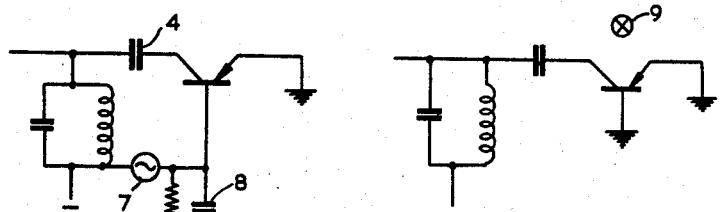
Fig. 3 shows a variant of Fig. 1.
Fig. 4 shows another variant of Fig. 1.

Several variations of the circuit shown in Fig. 1 are possible. Thus, in Fig. 3, the control voltage may alternatively be included as a high-ohmic voltage source 7 in the base circuit of transistor 5. The R-C filter 8 must in this case have a small impedance for the circuit frequency with respect to the impedance of capacitor 4, but a high impedance for the frequencies of the source 7.

Furthermore, instead of utilizing a current source or a voltage source, use may be made of a radiation source, for example a small lamp 9 (Fig. 4), as the source of control voltage. The load carriers thus released in the emitter-base junction bring about quite similar phenomena.

It may be advantageous to choose the transistor of a type such as described in U.S. patent application Serial No. 679,288, filed August 20, 1957, in which the emitter-base current path locally has a narrow portion such that, if the voltage between the collector and the base exceeds a prescribed value, an exhaustion layer starts from the collector zone such that said current path is cut-off.

A transistor of this kind is shown diagrammatically in

Figure 5:
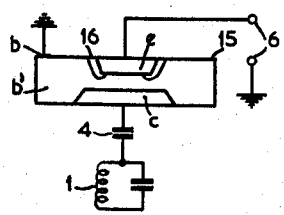
Fig. 5 shows a variant of Fig. 1 comprising a transistor of special type.

Fig. 5. Around the emitter $e$ of transistor 15, a portion of the base material has been removed by etching, resulting in a small groove 16. For a voltage $V_0$ at the collector $c$ such that the depletion layer starting from this collector and penetrating the base zone $b'$ reaches the groove 16, the current path between emitter $e$ and base contact $b$ is interrupted.

Figure 6:
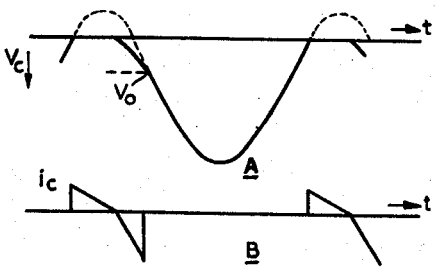
Fig. 6 shows voltage-time and current-time diagrams to explain Fig. 5.

If such a transistor is connected via capacitor 4 to the oscillatory circuit 1 in the manner shown in Fig. 1, whilst a modulation source 6 is included in the emitter circuit, the collector voltage $V_c$ and the collector current $i_c$ each show, as a function of time, an image as shown in Figs. 6A and 6B, respectively. The collector current $i_c$ is cut-off at the moment when the collector voltage $V_c$ reaches the value $V_0$. The current $i_c$ is thus shifted in phase substantially exactly 90° with respect to the voltage $V_c$, so that the circuit 1 is damped to a smaller extent.

What is claimed is:

1. A circuit for controlling the resonant frequency of an oscillatory circuit comprising a transistor having base, collector, and emitter electrodes, a capacitor having one terminal comprising the sole connection to said collector electrode, means connecting said base electrode and the other terminal of said capacitor to different points on said oscillatory circuit, and means applying a control voltage to the emitter-base circuit of said transistor.

2. A circuit for controlling the resonant frequency of an oscillatory circuit comprising a transistor having base, collector, and emitter electrodes, a capacitor having one terminal comprising the sole connection to said collector electrode, means connecting said base electrode and the other terminal of said capacitor to different points on said oscillatory circuit so that a collector electrode voltage is provided as a result of collector-base rectification of oscillations applied to the collector-base path of said transistor by way of said capacitor, and means applying a control voltage to the emitter-base circuit of said transistor to vary the phase of said collector-electrode voltage and thereby detune said oscillatory circuit.

3. A circuit as claimed in claim 2, in which said transistor is responsive to radiant energy, and in which said means applying a control voltage to the emitter-base circuit of said transistor comprises a source of radiant energy.

4. A circuit as claimed in claim 2, in which said transistor is the type in which the current flowing between the emitter and base electrodes becomes interrupted when the voltage between the collector and base electrodes exceeds a predetermined value.

5. A frequency modulation system comprising an oscillator having a frequency-determining circuit, a transistor having base, collector, and emitter electrodes, a capacitor connected serially between one point of said frequency determining circuit and said collector electrode and comprising the sole connection to said collector electrode, means connecting said base electrode to another point on said frequency determining circuit so that a collector voltage is provided as a result of collector-base rectification, and a source of control voltage connected between said base and emitter electrodes.

References Cited in the file of this patent

UNITED STATES PATENTS

| | | |
|---|---|---|
| 2,666,902 | Koros | Jan. 19, 1954 |
| 2,764,687 | Buchanan et al. | Sept. 25, 1956 |
| 2,778,956 | Dacey et al. | Jan. 22, 1957 |
| 2,790,088 | Shive | Apr. 23, 1957 |
| 2,805,397 | Ross | Sept. 3, 1957 |
| 2,844,795 | Herring | July 22, 1958 |

FOREIGN PATENTS

| | | |
|---|---|---|
| 1,131,428 | France | Feb. 21, 1957 |